United States Patent Office 3,743,556
Patented July 3, 1973

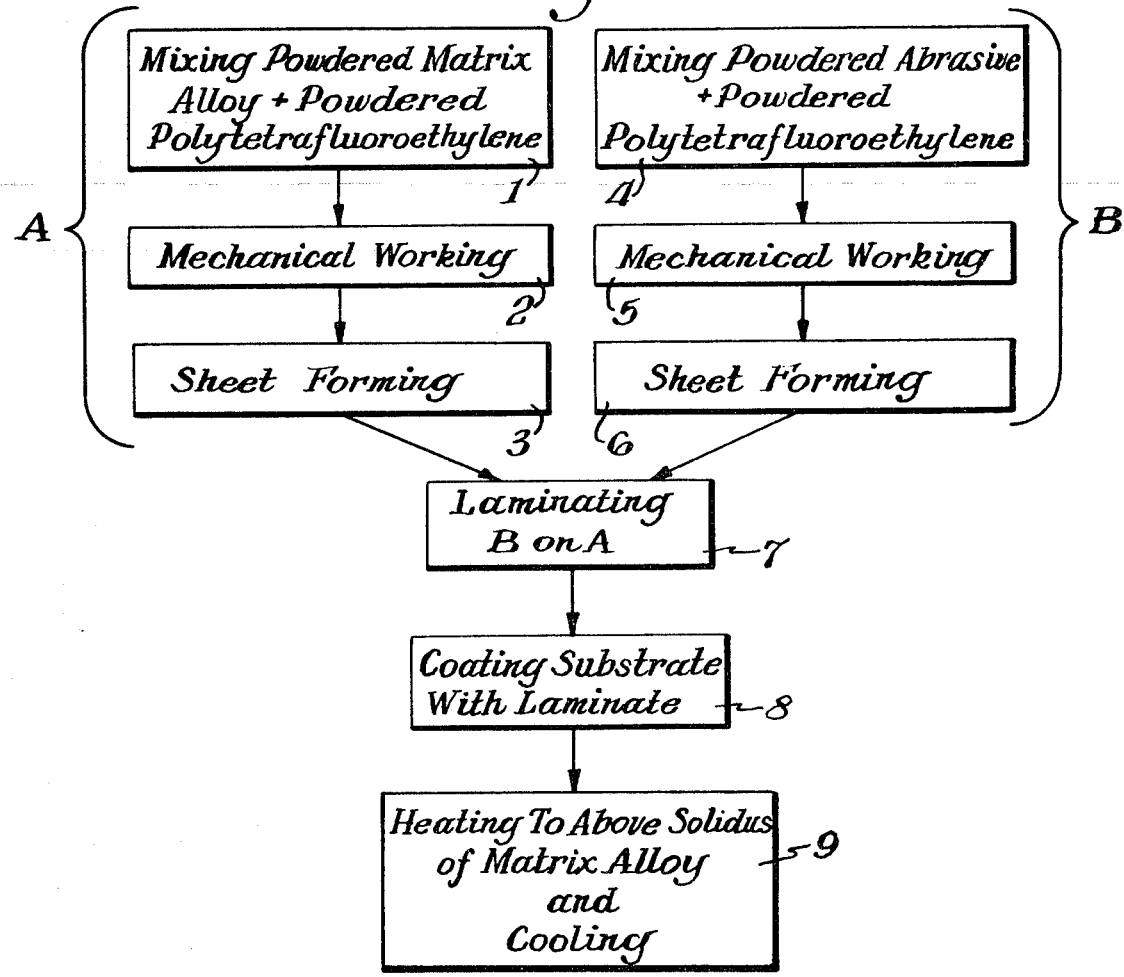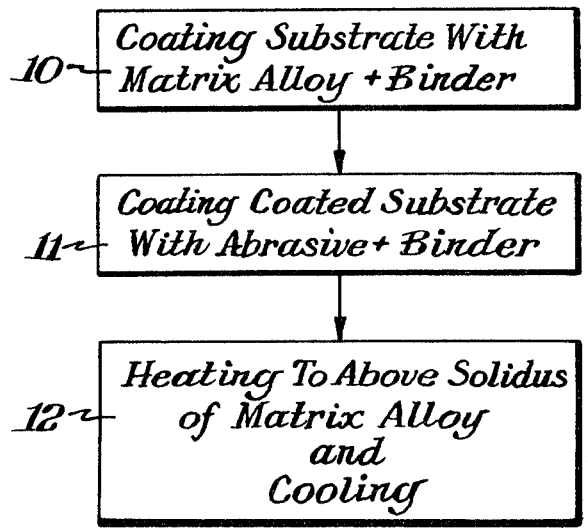
INVENTORS
Ernest J. Breton
Jack D. Wolf
Dexter Worden
John T. Bailey
BY
ATTORNEY July 3, 1973   E. J. BRETON ET AL   3,743,556
COATING METALLIC SUBSTRATE WITH POWDERED FILLER
AND MOLTEN METAL
Filed March 30, 1970   3 Sheets-Sheet 2
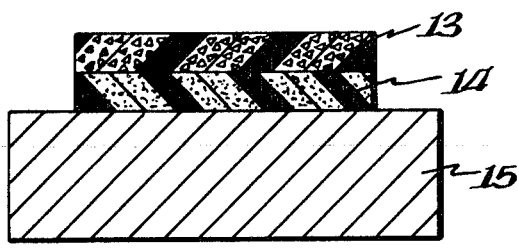
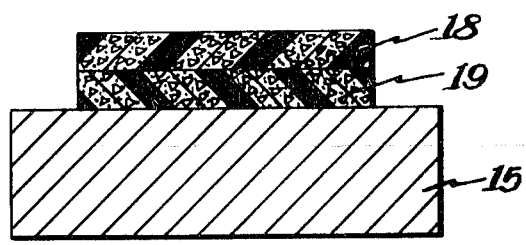
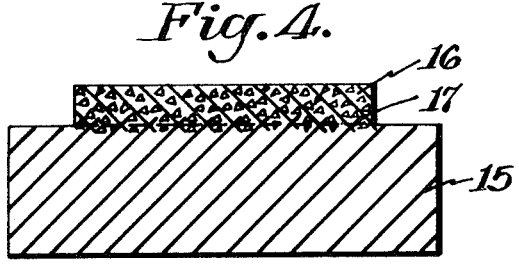
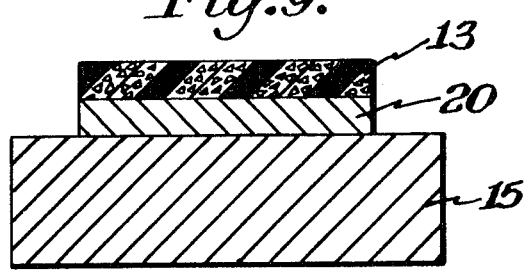
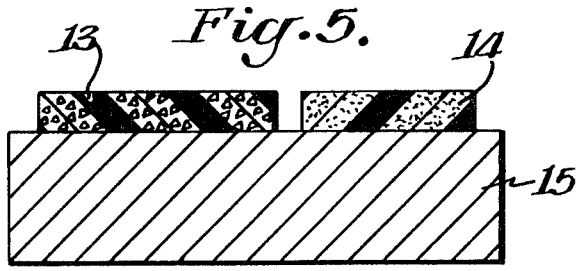
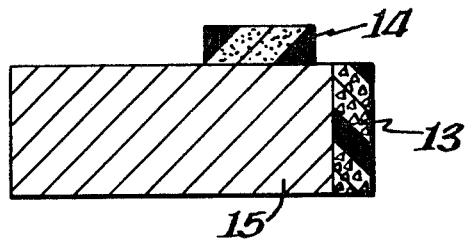
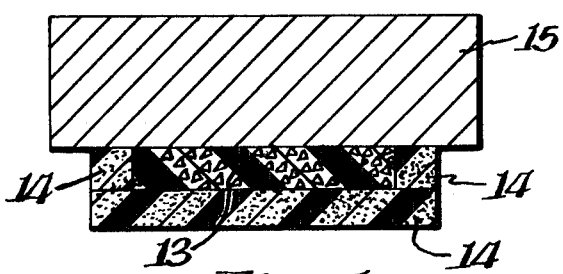
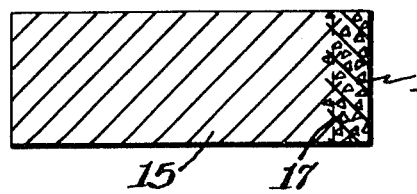
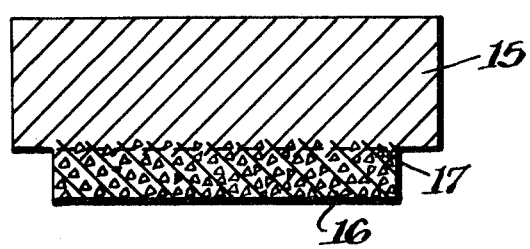
INVENTORS
Ernest J. Breton
Jack D. Wolf
Dexter Worden
BY John T. Bailey
S. V. Abramo
ATTORNEY

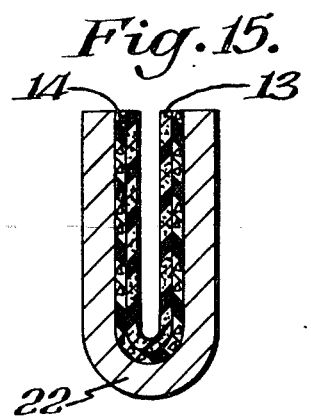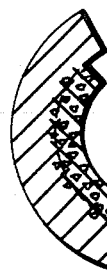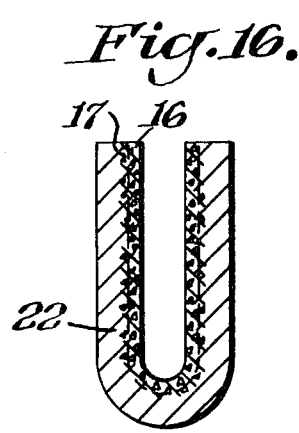

3,743,556
COATING METALLIC SUBSTRATE WITH POWDERED FILLER AND MOLTEN METAL
Ernest J. Breton, Jack D. Wolf, Dexter Worden, and John T. Bailey, Wilmington, Del., assignors to Composite Sciences, Inc., Wilmington, Del.
Filed Mar. 30, 1970, Ser. No. 23,907
Int. Cl. B32h 31/26; B23p 3/10
U.S. Cl. 156—62.8         12 Claims

ABSTRACT OF THE DISCLOSURE

A process for coating a substrate within a thin coating composed of a filler dispersed in a metallic matrix wherein a film or sheet of a mixture of an organic binder and a filler which is wetted by the metallic matrix in the molten state, said filler comprising a powdered metal, intermetallic compound, abrasive or a mixture thereof is placed upon a surface or portion thereof of a substrate, a layer of matrix metal having a solidus temperature lower than either the substrate and the filler is placed contiguous to the film or sheet of the filler to produce an assembly which is heated to at least the solidus of the matrix metal and below the solidus temperatures of the substrate and filler and above the decomposition temperature of the binder whereby the molten metal infiltrates or infuses into the filler layer to give, upon cooling a thin coating of the metallic matrix filled with the filler. The process is useful for preparing coated substrates which have corrosion or wear resistance.

BACKGROUND OF THE INVENTION

(1) Field of the invention

This invention relates to a process for coating a substrate with a coating composed of a metal matrix filled with a filler.

(2) The prior art

It is sometimes advantageous to coat a substrate, especially a metal, with a coating having special properties, for example, wear resistance or corrosion resistance. Wear resistance can be provided for a substrate by coating it with a coating composed of a mixture of a hard abrasive material such as powdered tungsten carbide and the like dispersed in a hard metal matrix. Corrosion and wear resistance can be provided to a substrate with a similar coating composed of a corrosion resistant metal or alloy as the matrix.

Prior to our invention it was difficult to produce such filled coating especially on objects having an intricate or complicated shape. In the prior methods using plasma and flame spraying techniques it is difficult to get uniform coatings on a substrate, especially a substrate having an intricate surface. A similar difficulty occurs in the prior methods using the technique of dusting the metal and abrasive on the substrate. Our invention, which eliminates the difficulties that exist in the prior art methods, consists of laying on the substrate a film of a desired thickness of metal or alloy matrix material in an organic binder. A second film of a powdered filler such as tungsten carbide in an organic binder is placed on the substrate contiguous to the filler filled film. The filler material is characterized as being wetted by the matrix metal or alloy in the molten state. This assembly is heated to decompose the binder and melt the matrix metal or alloy which is infused by capillary action into the filler layer. Cooling yields a coated substrate having a filler filled, void-free coating of the matrix metal.

SUMMARY OF THE INVENTION

This invention is directed to a process for coating a substrate with a coating of a metal matrix into which is dispersed a filler comprising attaching a film of powdered filler in a binder on a substrate; attaching contiguous to said filler containing film a layer comprising a metal or alloy, said metal or alloy having a solidus temperature lower than either the substrate or the filler and said metal or alloy when molten characterized as wetting said filler; heating to at least the solidus temperature of said metal to melt said metal or alloy whereby said molten metal or alloy produced is infused into the filler layer; and cooling to a temperature below said solidus temperature of said metal or alloy.

The process of this invention is useful for preparing a wear-resistant coating on a substrate such as a wear-resistant coating on a turbine blade.

BRIEF DESCRIPTION OF THE DRAWINGS

FIG. 1 is a flow diagram showing the process of this invention wherein the binder is polytetrafluoroethylene which is fibrillated by mechanical working.

FIG. 2 is a flow diagram of the process of this invention.

FIGS. 3, 5, 6, 8, 9, 10, 12, 14 and 15 are cross-sectional views of the arrangement of the coating assembly of this invention.

FIGS. 4, 7, 11, 13 and 16 are cross-sectional views of the coated substrate of this invention.

DESCRIPTION OF THE PREFERRED EMBODIMENTS

We have discovered that a filled coating on a substrate is conveniently prepared by the steps of adhering with an adhesive on a substrate a film or layer of a powdered filler mixed with a binder followed by contacting, at elevated temperatures, said filler layer with molten metal or alloy which is characterized as wetting said filler. The molten metal or alloy infuses into the filler layer and, upon cooling, yields a filled-metal coating on the substrate. The elevated temperatures causes the decomposition or volatilization of the binder and adhesive.

The invention is further illustrated in the drawings.

FIG. 1 shows a preferred embodiment of the invention. In FIG. 1 steps 1, 2 and 3 are used to form a sheet A of powdered matrix alloy (or metal) dispersed in a polytetrafluoroethylene binder. Step 1 consists of mixing powdered matrix alloy with 1 to 15%, by volume, of powdered polytetrafluoroethylene. The powdered matrix alloy can be an alloy such as a nickel or cobalt based alloy. The alloy should have a solidus temperature lower than the solidus temperature or melting point of the substrate to be coated. The particle size of the powdered alloy can vary greatly. For example, the particle size can vary from −50 to −325 mesh, for example −50, −100, −150, −200, −250, −325 mesh or mixtures thereof in particle size. Smaller particles, for example particles having diameters of greater than 1.0μ can also be used. Mixtures of the various particles can be used to advantage to increase the amount of filler in the final coating. The powdered polytetrafluoroethylene used in this embodiment is prepared as described in U.S. Pats. 2,586,357; 2,593,582; 2,670,417 and 2,685,707. This binder is produced by the polymerization of tetrafluoroethylene using a peroxide as a catalyst in water containing an emulsifying agent. The mixture of step 1 in the mechanically working step 2 is mechanically worked preferably cross-rolling into a self-supporting sheet as described in U.S. Pat. 3,281,511. Additionally, the mixture can be mechanically worked by ball milling for a period of time of about 30 minutes or by mix-mulling for a short period of time and the like. The mechanical working is believed to fibrillate the particles of polytetrafluoroethylene and to interweave the fibrils which are formed. In the sheet forming step 3, the sheet produced by the mechanical working step is passed through pressure rolls spaced to produce a sheet having a desired thickness. The sheet formed is used in the laminating step 7.

Steps 4, 5 and 6 can be used to form sheet B of powdered abrasive dispersed in a polytetrafluoroethylene binder. Step 4 consists of mixing powdered abrasive such as a metal carbide, such as WC or $WC_2$, a metal boride, a metal silicide and the like with 1–15%, by volume, of the powdered polytetrafluoroethylene used in step 1 described above. The mixture is subjected to a mechanical working step 5 identical to the mechanical working step 2 and the resulting sheet or mixture is converted into a sheet having a desired thickness in the sheet forming step 6 by passing said sheet or mixture through spaced pressure rolls. Sheet B is laminated with sheet A in the laminating step 7 by placing one sheet upon the other and passing them through pressure rolls to produce a laminate or a composite. Alternatively lamination can be affected by use of adhesive such as acrylic cements, shellac and the like. The laminate or composite is attached to the substrate by means of a small amount of an adhesive such as shellac, acrylic cements or rubber cement in step 8 with the powdered matrix alloy filled sheet A being placed contiguous to the substrate. The assembly produced in step 8 is heated to a temperature above the solidus of the matrix alloy at which temperature the polytetrafluoroethylene decomposes into volatile products. The molten matrix alloy infuses into the powdered abrasive by capillary action to produce, upon cooling a coating on the substrate of an alloy matrix filled with abrasive.

FIG. 2 is another preferred embodiment of the invention. In FIG. 2 step 10 consists of coating a substrate with a mixture of matrix alloy (or metal) and a binder. The coating mixture can be sheet A of FIG. 1 or it can be a mixture of powdered matrix alloy and a binder such as shellac, polymethylmethacrylate, and the like. A second coating is placed over the matrix alloy filled coating in step 11. In step 11 a section of sheet B described in FIG. 1 or a mixture of powdered abrasive and a binder described in step 10 is placed over the matrix alloy filled coating or a film of the powdered abrasive in a binder such as shellac, polymethylmethacrylate and the like can be used. The assembly produced in step 11 is heated to a temperature above the solidus of the matrix alloy as described above in step 9. During the heating step, the binder is decomposed and volatilized and the matrix alloy upon melting infuses or infiltrates into the abrasive layer. A hard coating of abrasive filled matrix alloy on the substrate results upon cooling.

FIG. 3 shows the assembly formed in either step 8 or 11. In FIG. 3, the substrate 15 is coated with a composite having two layers. Layer 14 is a powdered matrix alloy dispersed in an organic polymeric binder. Layer 13 is a powdered abrasive dispersed in an organic polymeric binder. In FIG. 4, the abrasive-filled matrix alloy coated substrate produced by heating the assembly of FIG. 3 is shown. Heating is conducted by raising the temperature of the assembly in a furnace, preferably having a reducing atmosphere. During heating, the binder is decomposed or volatilized. In the final product, the substrate 15 is coated with a coating 16 consisting of the matrix alloy into which abrasive is dispersed. The coating is void-free and metallurgically bonded to the substrate by means of a metallurgical bond 17. The metallurgical bond is a thin layer between the substrate and the coating wherein alloying of the component of the coating and substrate has occurred. FIG. 5 shows another embodiment of the invention wherein the powdered abrasive-binder layer 13 described above and the matrix alloy filled layer 14 described above are merely in close proximity. Heating of the assembly of FIG. 5 volatilizes and decomposes the binder and then melts the alloy which is infused into the abrasive to produce the coated substrate shown in FIG. 4.

FIG. 6 is still another embodiment of the invention wherein a lower substrate surface can be coated. In this embodiment, the abrasive-filled layer 14 is placed contiguous to a lower surface of the substrate 15. The matrix alloy filled layers 13 are placed over and along sides of layer 14 to produce an assembly which is heated. Heating of this assembly volatilizes and decomposes the binder and produces the coated substrate shown in FIG. 7 wherein the substrate 15 is coated with a coating 16 metallurgically bonded to the substrate by means of the metallurgical bond 17.

A variation of the process of this invention is shown in FIG. 8 wherein layers 18 and 19 are mixtures of powdered abrasive and powdered matrix alloy dispersed in a binder. The abrasive in layer 18 can be 40% to 99%, by volume, omitting binder. On the other hand, the amount of matrix alloy in layer 19 can be 25–99%, by volume, omitting binder. Heating the assembly of FIG. 8 decomposes the binder and yields the coated substrate shown in FIG. 4.

Another embodiment of this invention is the assembly shown in FIG. 9 wherein layer 20 is a solid section of the matrix alloy which is placed contiguous to the substrate 15 and upon which is placed the layer 13. Upon heating of the assembly of FIG. 9, a coated substrate shown in FIG. 4 is produced. The coating is void-free and metallurgically bonded by a metallurgical bond 17.

FIG. 10 shows a preferred arrangement of layers 13 and 14 to produce the coated substrate shown in FIG. 11 wherein the coating is positioned on a vertical surface of the substrate. In FIG. 10, layer 14 is placed on a horizontal surface of the substrate in close proximity to layer 13 which is attached to a vertical surface. Layers 13 and 14 can be touching or they can be separated 0.25 to 0.5 inch or more.

FIGS. 12, 14 and 15 show the arrangement of layers 13 and 14 to produce the coated complex J shaped substrate 21 of FIG. 13 or to coat the inner portion of a U-shaped substrate 22 of FIG. 16. In FIG. 12, the abrasive-filled layer 13 is attached to the inner portion of the arc of the J-shaped substrate 21. The alloy-filled layer 14 is placed adjacent to the abrasive-filled layer. Heating decomposes and volatilizes the binder to yield the coating of FIG. 13 wherein the coating layer 16 is a void-free abrasive-filled layer metallurgically bound to the substrate by a metallurgical bond 17. A modification of the process is shown in FIG. 14 wherein an addition layer is placed immediately over the abrasive-filled layer and serves as a source of alloy and to hold the abrasive-filled layer in place.

In FIG. 15, layers 13 and 14 are the same as described above. In FIG. 16, layers 16 and 17 are the same as above.

The coatings produced in this invention can contain the filler component in an amount of 5% to 85%, by volume. Conveniently, the final coating can be prepared with 30 to 70%, by volume, filler.

Some of the binders and adhesives used in this invention can be the same. Shellac can serve in either capacity. Other materials which can serve in both capacities include solutions of polymethacrylate and polyacrylate polymers.

The following examples further illustrate the invention. In these examples percentages are by weight and degrees are in degrees centigrade unless otherwise indicated.

Example 1

(A) A mixture consisting of 5 volumes of polytetrafluoroethylene and 95 volumes of −325 mesh AMS-nickel based alloy 4775 (AMS–4775 contains, by weight, 5% silicon, 3.5% boron, 15% chromium, 4% iron, 0.6% carbon and the remainder is nickel) is ball-milled for about 30 minutes and then pressed between pressure rolls to give a flexible sheet 20 mils thick. A ring was formed from this sheet; said ring had a diameter of 2 inches and the hole in the center had a diameter of 0.75 inch. The ring was placed upon a low carbon steel plate.

(B) A mixture of 5 volumes of polytetrafluoroethylene and 95 volumes of −325 mesh tungsten carbide (WC) was ball-milled about 30 minutes and then passed through pressure rolls to form a flexible coherent sheet having a thickness of 30 mils. A circular ring having a diameter of 2 inches and internal hole with a diameter of 0.75 inch was cut from the flexible sheet. The ring was placed immediately on top of the ring prepared in part B on the low carbon steel plate and the laminate formed was slightly pressed together.

The plate with the laminate was heated at a temperature of 1960–1980° F. in a furnace having a hydrogen gas purge (the hydrogen preferably contained less than 0.06%, by volume, water vapor). After heating for about five minutes the plate was withdrawn from the hot zone and allowed to cool under a reducing atmosphere. Examination of the plate indicated that a tungsten carbide filled ring (2″ outer diameter—¾ inch inner diameter—having a thickness slightly greater than 30 mils) was strongly metallurgically bonded to the steel plate.

Example 2

A section of low carbon steel plate was bent into the form of a J. The semi-circle portion of the J had a diameter of about 0.5 inch. A section of WC-filled flexible sheet prepared in Example 1, part B, having a thickness of .090 inch was cemented to the inside of the semi-circle of the J-shaped plate using shellac as the adhesive. A section of the alloy-filled flexible sheet prepared in Example 1, part A, was placed contiguous and in contact with the WC-filled flexible sheet to produce an assembly similar to that shown in FIG. 12. This assembly was heated in a furnace having a hydrogen purge for 3.5 minutes at 980° C., 5 minutes at 1015° C., 7 minutes at 1025° C., 10 minutes at 1050° C. and 15 minutes at 1062° C. The section was allowed to cool in a hydrogen atmosphere. The metal of flexible sheet had infused into the WC flexible sheet to produce a layer in the arc of the J shape having a thickness of about .090 inch. The layer on microscopic inspection was shown to be metallurgically bonded to the steel plate.

Example 3

The procedure of Example 2 was repeated except that a solid section of 25 mil of AMS 4775 alloy was placed contiguous to the steel plate and a film of WC-filled sheet was placed on the AMS 4775 alloy as shown in FIG. 9. The assembly was heated in a furnace equipped with a hydrogen purge for 3 minutes at 980° C., 5 minutes at 1031° C., 10 minutes at 1057° C. and 15 minutes at 1067° C. The assembly was allowed to cool under a hydrogen atmosphere.

The WC-filled binder sheet in the final product was replaced by an alloy-filled layer insert metallurgically bonded to the low carbon steel plate.

Example 4

On an end section of low carbon steel was cemented with shellac, a section of a powdered tungsten carbide filled polytetrafluoroethylene flexible sheet prepared as described in Example 1, part B, as shown in FIG. 10. A supply of powdered AMS 4775 was placed on an upper horizontal part of the section of steel within about ¼ inch of the cemented flexible sheet. The assembly was heated to a temperature above the melting point of the AMS 4775. The molten AMS 4775 was infiltrated into the flexible sheet. The product obtained as shown by FIG. 11 consisted of a powdered tungsten carbide-filled AMS 4775 section metallurgically bonded to the low carbon steel.

Example 5

The process depicted in FIG. 3 was conducted by cementing with shellac a 5-gram section of powdered tungsten carbide filled fibrillated polytetrafluoroethylene weighing 5 g. and 60 mils thick prepared as described in Example 1 on a section of low carbon steel. Adjacent but not touching the tungsten carbide section was placed a 7 g. section of powdered AMS 4775 fibrillated tetrafluoroethylene filled sheet prepared as described in Example 1. The assembly was heated to above the liquidus of AMS 4775 in a hydrogen atmosphere. The tungsten carbide filled section was replaced with a powdered tungsten carbide filled AMS 4775 section about 60 mils thick metallurgically bonded to the low carbon steel.

Example 6

A section of low carbon steel was bent into a U shape similar to that depicted in FIG. 15. To the inside of the U shape was cemented with shellac a 14 mil section of AMS 4775. A section of fibrillated polytetrafluoroethylene filled sheet prepared as described in Example 1, part B, except that instead of powdered tungsten carbide a mixture of 75%, by weight, of powdered tungsten carbide and 25%, by weight, of AMS 4775. The assembly which is shown in FIG. 15 was heated at 395° C. for 3 minutes and then at 1050° C. for about 10 minutes in a hydrogen atmosphere. The product appeared as shown in FIG. 16 with the inner portion of the U coated with a coating of tungsten carbide-filled AMS 4775. The coating was uniformly metallurgically bonded to the steel.

Example 7

Example 1 was repeated except that the steel substrate had been coated with a 20% by weight aqueous suspension of magnesium hydroxide and fired at 1000° F. for 10 minutes and was allowed to cool to room temperature. The result was a ring composed of tungsten carbide bonded with AMS 4775 nickel alloy that could be removed from the surface of the steel. The dimensions of the ring were uniformally 10% less than that of the unfired ring. The ring had exceptionally good wear resistance. The ring was useful as a seal in a pump assembly.

Other shaped abrasive filled objects can be prepared using the process of Example 7 on a shaped substrate.

The substrate to be coated can be metals such as iron and its alloys, nickel and cobalt and their alloys, copper and its alloys, titanium and its alloys and the like. The substrate metal is limited in this invention to those having a melting or solidus temperature higher than the matrix metal or alloy and also higher than the decomposition temperature of the organic binder.

The matrix metal or alloy can be any such substance which has a lower melting point or solidus temperature than the substrate and which is characterized as wetting the filler. Preferably, the coating matrix is an alloy such as various iron-based, nickel-based, and cobalt-based alloys and the like. The filler can be an abrasive such as one of the metal carbides, for example, tungsten carbide, tantalum carbide, chromium carbide, titanium carbide, silicon carbide, and the like, metal borides, metal silicides, diamond and the like and mixtures of these. The filler can also be another metal or alloy.

The binder used to form the sheets containing either the powdered matrix metal or alloy or the sheets containing powdered filler can be an adhesive, shellac, rubber cement, benzene solution of a polymeric acrylate or methacrylate, other polymers and the like. The binder should volatilize or decompose on heating without the formation of substantial residue. The binder and its decomposition products should not attack the substrate or the coating components.

In this embodiment polytetrafluoro-ethylene conveniently serves as the binder. For example, a mixture of the powdered component described above and about 2–15%, by volume of polytetrafluoroethylene is cross-rolled and a sheet of the desired thickness is formed as described in U.S. Pat. 3,281,511. A small quantity of a lubricant such as Stoddard solvent can be added to the mixture to facilitate formation of the sheet. Alternately, a self-supporting sheet of the coating material can be formed by mechanically working the mixture, for example, by ball-milling for a period of time of about 30 minutes, a mixture of the powdered component mixed with 2–15%, by volume, of powdered polyeterafluoroethylene followed by a calendering step to form a self-supporting sheet of the described thickness. Other methods of mechanical working which can be used include cross-rolling, indenting, mix-mulling, pressing or a combination of these described in our co-pending application Ser. No. 818,781 filed Apr. 23, 1969. The powdered polytetrafluoroethylene used as a binder is prepared as described in U.S. Pats. 2,685,707; 2,680,417; 2,593,582 and 2,586,357.

The thickness of the binder filled sheets layer used in this process can vary greatly and still provide a flaw-free coating. For example, the thickness of the sheet and the resulting coating can be 0.005 inch or less to 0.25 inch or greater. Preferably the coating layer used in our process and resulting coating is about 0.005 to 0.125 inch. The alloy or metal filled layer can be the same or a different thickness than the abrasive-filled layer.

The coating produced is metallurgically bonded to the substrate when clean metal substrate is used. The metallurgical bond is a thin layer between the substrate and the coating where alloying of the elements coating matrix and elements of the substrate has occurred. The occurrence of the metallurgical bond is essential for producing a strong bond between the abrasive-filled coating and the substrate. The formation of a void-free coating which metallurgically bonded to the substrate by the process of our invention, was highly unexpected. The coated metal objects produced by our process are useful in applications where they are subjected to extremes of wear and erosion. Without the metallurgical bond, these objects would not be suitable in these applications.

The coatings produced by our invention are void and flaw-free. The absence of the binder is demonstrated by sectioning of the coated area followed by microscopic examination.

The filled coating contain, preferably, up to 60%, by volume, of the filler although higher amounts can be used like. The filler has an average particle diameter of 5–150 microns, or a mixture thereof, however, coarser or finer material or a mixture thereof can be used.

The methods by which the matrix layer and the filler layer are produced can vary. The matrix powder form can be mixed with a binder such as shellac, organic polymers such as methyl methacrylate or a flux and this mixture then is doctored upon the substrate in a uniform layer. This process is then repeated using a mixture of the filler and binder. A variation of this embodiment is to form the matrix layer on the substrate by alternately coating the substrate with binder.

The process can be modified during the cooling step to provide heat treatment to the substrate. In this modification, cooling can be conducted at a rate where hardening of the substrate occurs in accordance with well-known heat treatment techniques.

The process of our invention is useful for coating a substrate with a wear-resistant metal coating. Likewise the process is useful for coating a substrate with a corrosion and wear-resistant metal coating. Corrosion and wear resistance is an essential property for metallic articles such as subjected to corrosive material.

This invention is useful for forming a shaped article composed of a matrix of metal, alloy or intermetallic compound filled with a filler. In this use, the process is conducted on a substrate having a non-adhering surface.

Objects that can be coated by the process of this invention includes tools, work pieces, structural members and the like. In many of the objects, the working edge or surface need only be coated to provide wear or corrosion resistance in the area of the object subject to wear or corrosion.

The foregoing detailed description has been given for clarity of understanding only and no unnecessary limitations are to be understood therefrom. The invention is not limited to the exact details shown and described for obvious modifications will occur to those skilled in the art.

The preferred embodiment in which an exclusive privilege or position is claimed are as follows:

1. A process for coating a metallic substrate with a wear-resistant metallurgically bonded coating wherein said coating comprises: a particulate filler bonded by a matrix wherein
   (a) said matrix comprises a metal or alloy is characterized as having a solidus temperature lower than the metallic substrate and which, in the molten state, wets the substrate; and
   (b) said powdered filler comprises one or more metals, alloys or abrasive; said filler being characterized as having a solidus temperature higher than the matrix metal or alloy and being wetted by said matrix metal or alloy in a molten state; said process comprising
      (1) overlaying said substrate with a layer of said filler and at least one layer of said matrix in any arrangement that results in the filler layer being contiguous with the matrix layer;
      (2) heating to at least the solidus temperature of said matrix whereby molten matrix metal infiltrates into said filler layer and wets said substrate; and
      (3) cooling to a temperature below the solidus temperature of the matrix.

2. A process of claim 1 wherein
   (1) the matrix layer is a solid strip of the matrix or a flexible self-supporting sheet of at least 70%, by volume, of powdered matrix bonded with up to 30%, by volume, of an organic binder characterized as decomposing on heating without forming substantial residue; and
   (2) the filler layer is flexible self-supporting sheet of at least 70%, by volume, of said powdered filler bonded with up to 30%, by volume, of said organic binder.

3. The process of claim 1 wherein the ratio, by volume, of said filler to matrix is from 9 to 0.3; said matrix being one or more iron based alloys, nickel based alloys, or cobalt based alloys and said powdered filler is one or more wear-resistant alloys, diamond, tungsten carbide, tantalum carbide, chromium carbide, titanium carbide, silicon carbide, tungsten boride, tantalum boride, chromium boride, titanium boride, silicon boride, tungsten silicide, tantalum silicide, chromium silicide or titanium silicide; and the binder is shellac, polytetrafluoroethylene, polyvinyl, alcohol, a polymethacrylate, or a polyacrylate.

4. The process of claim 2 wherein
   (1) the self-supporting sheet is produced by mechanically working a mixture comprising 75 to 99%, by volume, of said powdered matrix metal or alloy and 1 to 25%, by volume, of unsintered powdered polytetrafluoroethylene and calendering to form a self-supporting sheet; and
   (2) the filler self-supporting sheet is produced by mechanically working a mixture comprising 75 to 99%, by volume, of powdered filler and 1 to 25%, by volume, of unsintered powdered polytetrafluoroethylene and calendering to form a self-supporting sheet.

5. The process of claim 4 wherein the matrix is an alloy comprising, by weight, 0–12% of silicon, 0–5% of boron, 0–24% of chromium, 0–30% of manganese, 0–42% of iron, 0–2% of carbon, 0–15% of phosphorus and the remainder of the alloy is nickel or cobalt or a mixture of nickel and cobalt and the filler is tungsten carbide, titanium carbide, or chromium carbide.

6. The process of claim 4 wherein the matrix alloy contains, by weight, 3.5% of boron, 15% of chromium, and the remainder of the alloy is nickel and the filler is tungsten carbide, titanium carbide or chromium carbide.

7. The process of claim 4 which comprises:
   (a) calendering said matrix sheet with said filler sheet to form a laminate;
   (b) overlaying said substrate with said laminate;
   (c) heating to at least the solidus temperature of said matrix whereby molten matrix metal infiltrates into said filler layer and wets said substrate; and
   (d) cooling to a temperature below the solidus temperature of the matrix.

8. A process for preparing an article of manufacture comprising a particulate filler bonded with a matrix wherein:
   (a) said matrix comprises a metal or alloys; and
   (b) said filler comprises one or more metal, alloys or abrasives characterized as being wet by said liquid matrix and by having a solidus temperature higher than the solidus of the matrix;
said process comprising,
   (1) overlaying a substrate with a layer of said filler and at least one layer of said matrix in any arrangement that results in the filler layer being contiguous with the matrix layer wherein said substrate is characterized as not being wetted by liquid matrix and by having a melting temperature higher than the solidus of the matrix; and
   (2) heating to at least the solidus temperature of said matrix whereby molten matrix metal infiltrates into said filler layer;
   (3) cooling to a temperature below the solidus of the matrix; and
   (4) removing said article of manufacture from the substrate.

9. The process of claim 8 wherein:
   (1) the matrix layer is a solid strip of said matrix or a flexible self-supporting sheet of at least 70%, by volume, of powdered matrix bonded with up to 30%, by volume, of an organic binder, characterized as decomposing on heating without forming substantial residue; and
   (2) the filler layer is a flexible self-supporting sheet of at least 70%, by volume, of said powdered filler bonded with up to 30%, by volume, of said organic binder.

10. The process of claim 8 wherein the ratio, by volume, of filler to matrix is from 9 to 0.3; said matrix being one or more iron based alloys, nickel based alloys, or cobalt based alloys and said powdered filler comprises 30 to 85%, by volume, of one or more wear resistant alloys, diamond, tungsten carbide, tantalum carbide, chromium carbide, titanium carbide, silicon carbide, tungsten boride, silicon boride, tantalum boride, chromium boride, titanium boride, tungsten silicide, tantalum silicide, chromium silicide, or titanium silicide; and the organic binder is shellac, unsintered powdered polytetrafluoroethylene, polyvinyl alcohol, a polymethacrylate or a polyacrylate.

11. The process of claim 9 wherein:
   (1) the matrix self-supporting sheet is formed by mechanically working a mixture comprising 75 to 99%, by volume, of said powdered matrix metal or alloy and 1–25%, by volume, of said unsintered powdered polytetrafluoroethylene and calendering to form a self-supporting sheet and
   (2) the filler self-supporting sheet is produced by mechanically working a mixture comprising 75 to 99%, by volume, of powdered filler and 1 to 25%, by volume, of unsintered powdered polytetrafluoroethylene and calendering to form a self-supporting sheet.

12. The process of claim 11 comprising
   (a) calendering said matrix sheet with said filler sheet to form a laminate;
   (b) overlaying said substrate with said laminate;
   (c) heating to at least the solidus temperature of said matrix whereby molten matrix metal infiltrates into said filler layer and wets said substrate; and
   (d) cooling to a temperature below the solidus temperature of the matrix.

References Cited
UNITED STATES PATENTS

| | | | |
|---|---|---|---|
| 3,312,546 | 4/1967 | Mayer et al. | 75—208 R |
| 3,360,350 | 12/1967 | Sama | 75—208 R UX |
| 3,510,296 | 5/1970 | Bergstrom | 75—201 |
| 3,415,672 | 12/1968 | Levinstein et al. | 117—130 R |
| 3,505,139 | 4/1970 | Wentworth | 156—89 |
| 3,535,146 | 10/1970 | Flicker | 117—130 R |
| 3,551,247 | 12/1970 | Feakes | 156—278 |
| 3,574,571 | 4/1971 | Friedrich et al. | 117—131 |
| 3,574,572 | 4/1971 | Friedrich et al. | 117—131 |

LELAND A. SEBASTIAN, Primary Examiner

U.S. Cl. X.R.

29—182.2, 182.7, 191.2, 472.7; 75—208 R, 212; 117—71, 75, 131; 156—62.2, 89, 155